United States Patent

Kimura et al.

[11] Patent Number: 5,966,232
[45] Date of Patent: Oct. 12, 1999

[54] SCANNING OPTICAL SYSTEM

[75] Inventors: Kazumi Kimura, Toda; Hiroshi Sato, Kawasaki; Takeshi Yamawaki, Tokyo, all of Japan

[73] Assignee: Canon Kabushiki Kaisha, Tokyo, Japan

[21] Appl. No.: 09/018,954

[22] Filed: Feb. 5, 1998

[30] Foreign Application Priority Data

Feb. 7, 1997 [JP] Japan ................................ 9-039924

[51] Int. Cl.$^6$ ................................ G02B 26/08
[52] U.S. Cl. .................... 359/205; 359/207; 359/212; 359/216; 347/259
[58] Field of Search ................... 359/196–226; 347/258–261

[56] References Cited

U.S. PATENT DOCUMENTS

| | | | |
|---|---|---|---|
| 4,878,066 | 10/1989 | Shiraishi | 346/108 |
| 5,189,546 | 2/1993 | Iizuka | 359/217 |
| 5,276,544 | 1/1994 | Maeda | 359/196 |
| 5,499,107 | 3/1996 | Kuroda | 358/347 |
| 5,751,462 | 5/1998 | Shiraishi et al. | 359/204 |
| 5,828,479 | 10/1998 | Takano et al. | 359/201 |

FOREIGN PATENT DOCUMENTS 0 572 806 A2  12/1993  European Pat. Off. .

*Primary Examiner*—James Phan
*Attorney, Agent, or Firm*—Fitzpatrick, Cella, Harper & Scinto

[57] ABSTRACT

A scanning optical system includes a light source, an optical deflector for deflecting a laser beam emitted from the light source, a first optical element for collimating the laser beam emitted from the light source into a parallel beam, a second optical element for focusing the parallel beam collimated by the first optical element to the optical deflector and making the parallel beam incident on the optical deflector, a third optical element for focusing the laser beam deflected by a deflection plane of the optical deflector onto a target irradiation surface. In a subscanning section of the scanning optical system, the following conditions are satisfied. An optical axis of the first optical element and an optical axis of the second optical element are parallelly decentered from each other. The second optical element and the third optical element are decentered from a central axis of the scanning optical system. The optical axis of the second optical element crosses the central axis of the scanning optical system near the optical deflector. The optical axis of the first optical element crosses the central axis of the scanning optical system near the second optical element. A central point of the third optical element is positioned on an extended line of the optical axis of the second optical element. The optical axis of the second optical element and a normal of the deflection plane of the optical deflector are not parallel to each other.

12 Claims, 6 Drawing Sheets

SCANNING OPTICAL SYSTEM

BACKGROUND OF THE INVENTION

1. Field of the Invention

The present invention is designed to appropriately perform temperature compensation of a plastic lens applied to a scanning optical system or a multi-beam scanning optical system and, more particularly, to reduce defocus and a shift in scanning position even in a scanning optical system or a multi-beam scanning optical system using an oblique incident scheme in a laser beam printer apparatus.

2. Related Background Art

FIG. 1 is a sectional view showing a conventional scanning optical system using a single laser beam projected along the subscanning direction. FIG. 2 is a sectional view showing a multi-beam scanning optical system using a plurality of laser beams projected along the subscanning direction.

In FIG. 1, a parallel beam (collimated beam) emerging from a laser collimator unit (not shown) is focused to a deflection point P near the deflection plane of an optical deflector 65 comprising, e.g., a polygon mirror through an incident lens 60 serving as an incident optical system. The laser beam deflectively reflected by the deflection plane is focused onto a target irradiation surface 66 through an f-θ lens 63 serving as an imaging optical system having a focusing function and f-θ characteristics so that the target irradiation surface 66 is scanned with the laser beam along the main scanning direction. In FIG. 1, the deflection point P and a focal point Q on the target irradiation surface 66 are optically conjugate with each other with respect to the f-θ lens 63 within the subscanning section.

The scanning optical system having this arrangement is used for, e.g., a laser beam printer apparatus (LBP) or a digital copying machine. In this case, the irradiation object is a photosensitive body. A latent image formed on the photosensitive body is printed on a paper sheet or the like by a generally known electrophotographic process.

In FIG. 2, two parallel beams (collimated beams) A and B emerging from two laser collimator units (not shown) are focused to a deflection point P near the deflection plane of an optical deflector 75 comprising a polygon mirror through incident lenses 70A and 70B serving as corresponding incident optical systems, respectively, and are focused to two focal points (exposure positions) $Q_A$ and $Q_B$ on a target irradiation surface 76 through f-θ lenses 71A and 71B serving as corresponding imaging optical systems, respectively. With this operation, the target irradiation surface 76 is simultaneously scanned with the two laser beams A and B.

In FIG. 2, since the two laser beams A and B are focused to very close positions on the deflection plane, the polygon mirror can be made thin. As a result, the load on the motor for rotating the polygon mirror can be reduced, so the operation speed can be increased.

Each of the incident optical systems 70A and 70B shown in FIG. 2 makes the laser beam obliquely incident on the deflection plane of the optical deflector 75 within the subscanning section parallel to the drawing surface and is called an oblique incident optical system.

To correct aberration generated when the laser beam is obliquely incident on the polygon mirror, the f-θ lenses 71A and 71B must be decentered from the principal rays of the laser beams A and B from the deflection plane within the subscanning section. In addition, the interval between the focal points $Q_A$ and $Q_B$ on the target irradiation surface 76 is defined by the specifications of the product. For a resolution of, e.g., 600 dpi, the interval is set to be an odd multiple of 42.3 μm, as is known.

When the interval between the focal points $Q_A$ and $Q_B$ is increased, and an additional electrophotographic process unit is disposed between the focal points $Q_A$ and $Q_B$, a two-color copy image can be obtained.

The f-θ lens 63, 71A, or 71B as an imaging optical system shown in FIG. 1 or 2 is increasingly formed from a plastic lens in recent years because of the following advantages.

(1) Since the imaging optical system can be formed by one lens, unlike a glass lens, the entire apparatus can be made compact and lightweight.

(2) Since the lens can be manufactured by molding, a large cost reduction and mass production are possible.

However, in the plastic lens, the change in the refractive index of the material or the shape due to an environmental variation (particularly a change in temperature) is larger than that of a glass lens by one or more orders of magnitudes, as is known. Consequently, the focal position of the laser beam on the target irradiation surface is shifted. Conventionally, the focal depth of the laser spot is set to be sufficiently large to cope with this phenomenon. In recent years, however, along with an increase in resolution of business equipment, a demand has arisen for an increase in stop diameter for making the laser spot small, so it is difficult to ensure a sufficiently large focal depth.

As a technique of coping with this requirement, the incident optical system 60 having a refracting power only within the subscanning section is constituted by a plano-convex cylindrical lens (glass plano-convex lens) 61 consisting of a glass material and a plano-concave cylindrical lens (plastic plano-concave lens) 62 consisting of a plastic material, as shown in FIG. 1, and caused to function as a temperature compensation system for the f-θ lens 63 consisting of a plastic material.

Assume that, upon an ambient temperature rise, (1) the refractive index of the material of the f-θ lens 63 decreases, and (2) the lens expands to relax a curvature R. The power of the f-θ lens 63 decreases in both the cases (1) and (2), so the focal point Q on the target irradiation surface 66 is defocused to Q'.

On the other hand, the absolute value of the power of the plastic plano-concave lens 62 of the incident lens 60 becomes small (the variation in the refractive index of the glass plano-convex lens 61 is much smaller than that of the plastic plano-concave lens 62). For this reason, the positive power of the entire incident lens 60 increases, so the deflection point P of the collimated beam is defocused to P'.

Therefore, when the respective elements are optimized such that the focal point P' after defocus and the focal point Q on the target irradiation surface 66 have an imaging conjugate relationship through the f-θ lens 63 upon a temperature rise, temperature compensation associated with defocus can be achieved.

The reason why the incident lens 60 is constituted by the glass plano-convex lens 61 and the plastic plano-concave lens 62 from the incident side in FIG. 1 is that spherical aberration can be easily corrected, and the glass plano-convex lens 61 can be easily manufactured.

However, the multi-beam scanning optical system using the oblique incident scheme as shown in FIG. 2 has the following problem. The f-θ lenses (71A and 71B) in FIG. 2 are optical systems symmetrical about a symmetrical axis M, and the following description will be provided of using the laser beam (light beam) passing through the f-θ lens 71B, as will be described below.

Upon a temperature rise as an environmental variation, the power of the f-θ lens 71B consisting of a plastic material decreases, so that the focal point $Q_B$ on the target irradiation surface 76 at room temperature moves to $Q'_B$, i.e., defocus takes place. To correct this defocus, the oblique incident optical system 70B is constituted by a glass plano-convex lens and a plastic plano-concave lens as shown in FIG. 1 to change the deflection point P on the deflection plane at room temperature to a focal point P' after the temperature rise. With this arrangement, the focal point $Q'_B$ is also defocused and moves to $Q''_B$, so focus correction is enabled. More specifically, since the deflection point P moves to P' along the optical axis, the focal point $Q'_B$ also moves to $Q''_B$ along the optical axis.

The focal point $Q_B$ at room temperature moves to $Q''_B$ after temperature rise, so focus compensation is achieved. However, the spot position is shifted by the distance between the focal point $Q_B$ and the focal point Q''. This positional shift of the spot is a serious problem in image formation because, especially in the multi-beam scanning optical system shown in FIG. 2, the interval between the focal points $Q_A$ and $Q_B$ of the two laser beams A and B on the target irradiation surface 76 changes before and after a temperature rise.

SUMMARY OF THE INVENTION

The present invention has been made to solve the above problem, and has as its object to provide a scanning optical system and multi-beam scanning optical system which appropriately perform temperature compensation of a plastic lens applied to the scanning optical system and a multi-beam scanning optic[]al system, and more particularly, appropriately constitute elements of the scanning optical system and multi-beam scanning optical system using an oblique-incident scheme to reduce defocus or a shift in scanning position, thereby increasing the stability of quality of the apparatus.

According to the present invention, there is provided a scanning optical system which scans a target irradiation surface with a laser beam emitted from light source means through an optical deflector, comprising:

a first optical element for collimating the laser beam emitted from the light source means into a parallel beam;

a second optical element for focusing the parallel beam collimated by the first optical element on the optical deflector and making the parallel beam incident on the optical deflector; and a third optical element for focusing the laser beam deflected by a deflection plane on the optical deflector onto the target irradiation surface, wherein within a subscanning section of the scanning optical system, an optical axis of the first optical element and an optical axis of the second optical element are parallel decentered from each other, the second optical element and the third optical element are decentered from a central axis of the scanning optical system, the optical axis of the second optical element crosses the central axis of the scanning optical system near the optical deflector, the optical axis of the first optical element crosses the central axis of the scanning optical system near the second optical element, a central point of the third optical element is positioned on an extended line of the optical axis of the second optical element, and the optical axis of the second optical element and a normal of the deflection plane of the optical deflector are not parallel to each other.

According to the present invention, there is also provided a scanning optical system which scans a target irradiation surface with a laser beam emitted from light source means through an optical deflector, comprising:

a first optical element for collimating the laser beam emitted from the light source means into a parallel beam;

a second optical element for making the parallel beam collimated by the first optical element obliquely incident on a deflection plane of the optical deflector within a subscanning section and focusing the parallel beam near the optical deflector; and a third optical element for focusing the laser beam deflected by the deflection plane of the optical deflector onto the target irradiation surface, wherein within the subscanning section of the scanning optical system, the third optical element is decentered from a principal ray of the laser beam deflected by the deflection plane, an optical axis of the first optical element and an optical axis of the second optical element are parallel decentered from each other, and a central point of the third optical element is positioned on an extended line of the optical axis of the second optical element.

Especially, in the scanning optical system, the second optical element comprises, from the light source means side, a meniscus concave cylindrical lens essentially consisting of a plastic material and having a convex surface facing an incident side, and a plano-convex cylindrical lens essentially consisting of a glass material and having a convex surface facing the incident side and a flat surface facing an exit side.

In the scanning optical system, each of the concave cylindrical lens and the plano-convex cylindrical lens is partially cut and asymmetrical about the optical axis.

In the scanning optical system, the third optical element has a plastic lens.

In the scanning optical system, letting θ be an angle formed by the optical axis of the second optical element and the principal ray of the laser beam incident on the optical deflector, the following equation is satisfied:

$$\theta \simeq \tan^{-1}\left[\frac{D}{f_3(1+m)}\right] \quad (1)$$

where m: the magnification of the third optical element in a subscanning direction $f_3$: the focal length of the third optical element in the subscanning direction D: the decentering amount of the third optical element with respect to the principal ray of the laser beam.

In the scanning optical system, letting $\Delta f_2$ be a variation amount of a focal length of the second optical element in a subscanning direction due to an environmental variation, the following equation is satisfied:

$$|\Delta f_2| \simeq \frac{\Delta f_3 \cdot f_3 (m+1)(1+1/m)}{m \cdot f_3 - \Delta f_3} \quad (2)$$

where $\Delta f_3$: the variation amount of a focal length of the third optical element in the subscanning direction due to the environmental variation m: the magnification of the third optical element in the subscanning direction $f_3$: the focal length of the third optical element in the subscanning direction D: the decentering amount of the third optical element with respect to the principal ray of the laser beam.

According to the present invention, there is also provided a scanning optical system which collimates a laser beam emitted from light source means into a parallel beam through a first optical element, makes the parallel beam obliquely incident on a deflection plane of an optical deflector within a subscanning section through a second optical element having a positive refracting power, and guides the laser beam deflected by the deflection plane of the optical deflector onto a target irradiation surface through a third optical element to scan the target irradiation surface with the laser beam.

The respective elements are arranged such that a principal ray of the laser beam obliquely incident on the deflection plane of the optical deflector within a subscanning section, an optical axis of the second optical element, and a normal of the deflection plane of the optical deflector are not parallel to each other, a central point of the second optical element, a deflection point of the optical deflector, and a central point of the third optical element are positioned on a straight line, and the straight line and the principal ray, of the laser beam incident on the third optical element are substantially parallel to each other.

According to the present invention, there is also provided a scanning optical system which collimates a laser beam emitted from light source means into a parallel beam through a first optical element, makes the parallel beam obliquely incident on a deflection plane of an optical deflector within a subscanning section through a second optical element having a positive refracting power, and guides the laser beam deflected by the deflection plane of the optical deflector onto a target irradiation surface through a third optical element to scan the target irradiation surface with the laser beam.

A wherein prism is arranged in an optical path between the second optical element and the optical deflector, and an optical axis of the second optical element and an optical axis of the first optical element are parallel decentered from each other.

In the scanning optical system, a central point of the third optical element is positioned on an extended line of the optical axis of the second optical element.

In the scanning optical system, the second optical element comprises, from the light source means side, a meniscus concave cylindrical lens essentially consisting of a plastic material and having a convex surface facing an incident side, and a plano-convex cylindrical lens essentially consisting of a glass material and having a convex surface facing the incident side and a flat surface facing an exit side.

In the scanning optical system, each of the concave cylindrical lens and the plano-convex cylindrical lens is partially cut.

In the scanning optical system, the third optical element has a plastic lens.

According to the present invention, there is also provided a multi-beam scanning optical system in which the above scanning optical system is applied to a multi-beam scanning optical system which simultaneously scans the target irradiation surface with a plurality of laser beams.

DETAILED DESCRIPTION OF THE PREFERRED EMBODIMENTS

Figure 3:
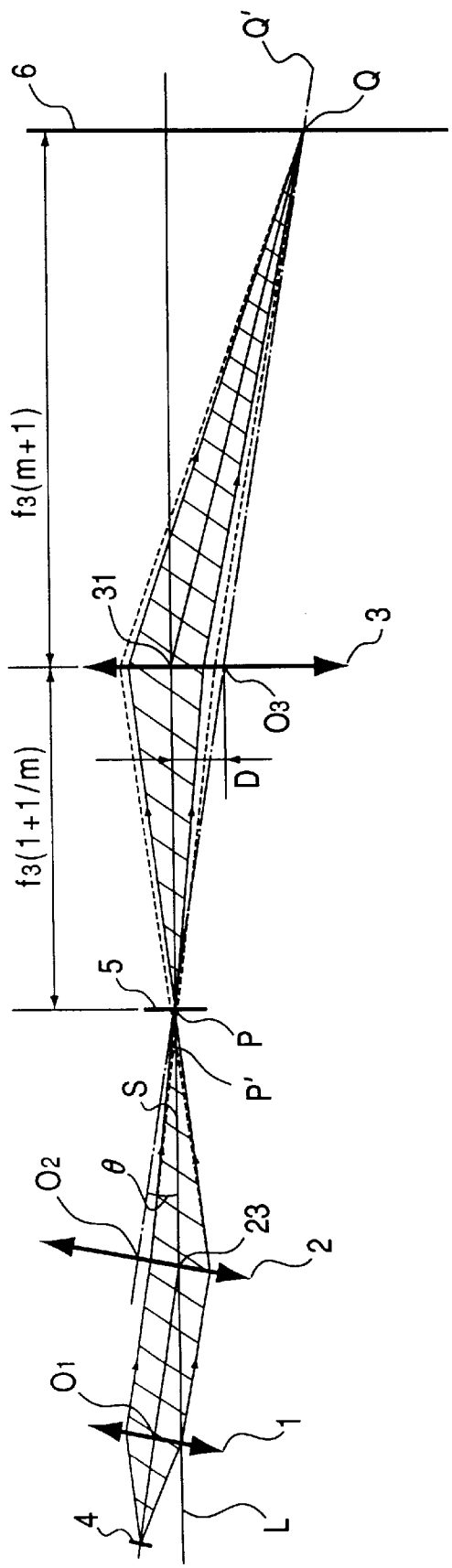
FIG. 3 is a sectional view showing the refracting power arrangement of a scanning optical system along the subscanning direction according to the first embodiment of the present invention.
Figure 4:
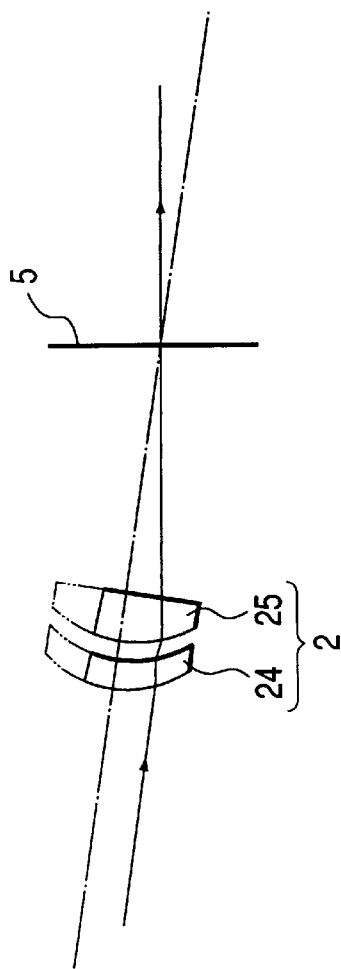
FIG. 4 is a sectional view showing the arrangement near the secondoptical element shown in FIG. 3.

FIG. 3 is a sectional view showing the refractive power arrangement of a scanning optical system according to the first embodiment of the present invention, which is used for a laser beam printer apparatus. FIG. 4 is a sectional view showing the arrangement near the second optical element shown in FIG. 3.

In FIG. 3, a light source means 4 comprises, e.g., a semiconductor laser and is positioned on the optical axis of the first optical element (to be described later). A collimator lens 1, as the first optical element, collimates a laser beam emitted from the light source means 4 into a parallel beam (collimated beam).

An incident lens (incident optical system) 2 as the second optical element has a refracting power only within the subscanning section. The incident lens 2 has a hybrid structure: a meniscus concave cylindrical lens 24 consisting of a plastic material and having a convex surface facing the incident side, and a plano-convex cylindrical lens 25 consisting of a glass material and having a convex surface facing the incident side and a flat surface facing the exit side. The incident lens 2 focuses the parallel beam collimated by the collimator lens 1 and makes it incident on an optical deflector 5 (to be described later). Each of the two cylindrical lenses 24 and 25 has a predetermined refracting power only in the subscanning direction. In addition, since the two cylindrical lenses 24 and 25 can be arranged above and below the principal ray of the laser beam, the two cylindrical lenses 24 and 25 are partially cut (broken lines), as shown in FIG. 4, thereby achieving space reduction of the entire apparatus.

The optical deflector 5 serves as a deflection means and comprises, e.g., a polygon mirror. The optical deflector 5 is rotated by a driving means such as a motor (not shown) at a predetermined speed. An f-θ lens 3, consisting of a plastic material, has the focusing function and f-θ characteristics as the third optical element. The f-θ lens 3 forms the image of the laser beam on a photosensitive drum surface 6 as a target irradiation surface on the basis of image information deflected by the optical deflector 5 in the main scanning direction. This f-θ lens 3 makes the deflection plane of the optical deflector 5 optically conjugate with the photosensitive drum surface 6 (recording medium surface). The collimator lens 1, the incident lens 2, and the f-θ lens 3 have central points (optical axes) $O_1$, $O_2$, and $O_3$, respectively.

In this embodiment, the normal of the deflection plane including a deflection point P on the deflection plane of the optical deflector 5 is defined as a central axis L of the scanning optical system.

In this embodiment, within the subscanning section of the scanning optical system, the optical axis of the collimator lens 1 and that of the incident lens 2 are parallel decentered from each other (the optical axes are parallel to each other), the incident lens 2 and the f-θ lens 3 are decentered from the central axis L of the scanning optical system.

The optical axis of the incident lens 2 crosses the central axis L of the scanning optical system near the polygon mirror 5, and the optical axis of the collimator lens 1 crosses the central axis L of the scanning optical system near the incident lens 2, the central point $O_3$ of the f-θ lens 3 is positioned on the extended line of the optical axis of the incident lens 2, and the optical axis of the incident lens 2 and the normal of the deflection plane of the polygon mirror 5 are not parallel.

In this embodiment having the above arrangement, a laser beam from the light source means 4 is collimated into an almost parallel beam (collimated beam) by the collimator lens 1 and is incident on the incident lens 2. Within the main scanning section perpendicular to the subscanning section, the incident lens 2 directly outputs the incident parallel beam. Within the subscanning section, the incident lens 2 focuses the light beam and forms an almost linear image of the light beam on the deflection plane of the optical deflector 5. The laser beam deflected by the deflection plane of the optical deflector 5 passes through the f-θ lens 3 and is corrected in its scanning linearity. The image of the laser beam is formed on the photosensitive drum surface 6 as the target irradiation surface to optically scan the photosensitive drum surface 6 with almost uniform linear motion in the main scanning direction. With this operation, an image is recorded.

In this embodiment, when (1) the refractive index of the material of the f-θ lens 3 decreases, and (2) the lens expands to relax a curvature R upon, e.g., an ambient temperature rise, and the power of the f-θ lens 3 decreases in both the cases (1) and (2), so a focal point Q on the target irradiation surface 6 is defocused to Q'.

On the other hand, the absolute value of the power of the concave cylindrical lens 24 of the incident lens 2, which is made of a plastic material, becomes small (the variation in refractive index of the plano-convex cylindrical lens 25 consisting of a glass material is much smaller than that of the plastic concave cylindrical lens 24 and is negligible). For this reason, the positive power of the entire incident lens 2 increases, so the focal point P of the collimated beam is defocused to P'.

Therefore, when the respective elements are optimized such that the focal point P' after defocus and the focal point Q on the target irradiation surface 6 have a conjugate imaging relationship within the subscanning section through the f-θ lens 3 upon a temperature rise, temperature compensation associated with defocus can be achieved.

More specifically, in this embodiment, the respective elements are set to satisfy conditions (A) below:

at ambient temperature: the focal point P and the imaging point Q have an optically conjugate relationship with respect to the f-θ lens 3; and at an increased temperature: the focal point P and the imaging point Q' have an optically conjugate relationship with respect to the f-θ lens 3, or at ambient temperature: the focal point P' and the imaging point Q have an optically conjugate relationship with respect to the f-θ lens 3.

In this embodiment, the focal points P and P' and the imaging points Q and Q' described above are set to be positioned on the optical axis of the incident lens 2 and the extended line of the optical axis.

In this embodiment, let θ be the angle formed by the optical axis ($O_2$–P) of the incident lens 2 and a principal ray S of the laser beam incident on the optical deflector 5. At this time, the respective elements are set such that the angle θ is given by:

$$\theta \simeq \tan^{-1}\left[\frac{D}{f_3(1+m)}\right] \quad (1)$$

where m: the magnification of the third optical element in the subscanning direction (within the subscanning section); and $f_3$: the focal length of the third optical element in the subscanning direction (within the subscanning section)

D: the decentering amount of the third optical element with respect to the principal ray of the laser beam.

A focal length $f_2$ of the incident lens 2 of this embodiment changes to $f_2+\Delta f_2$ after a temperature rise due to an environmental variation (particularly a change in temperature). In this case, $f_2 \simeq O_2 P$ $f_2+\Delta f_2 = O_2 P'$ i.e., $|\Delta f_2|=|PP'|$ The specific magnitude of the variation amount $\Delta f_2$ of the focal length in the subscanning direction (within the subscanning section) due to the environmental variation is given by:

$$|\Delta f_2| \simeq |PP'| \simeq \frac{\Delta f_3 \cdot f_3(m+1)(1+1/m)}{m \cdot f_3 - \Delta f_3} \quad (2)$$

(where $f_3+\Delta f_3$ is the focal length of the f-θ lens 3 after temperature rise)

This equation is obtained following the procedure below.

As shown in FIG. 3, the f-θ lens 3 is arranged at a position separated from the optical deflector 5 by $f_3(1+1/m)$, and
from the target irradiation surface 6 by $f_3(m+1)$
From the imaging relation, $$\frac{1}{f_3} = \frac{1}{f_3(m+1)} + \frac{1}{f_3(1+1/m)} \tag{3}$$

On the basis of conditions (A), the imaging relation after a temperature rise is $$\frac{1}{f_3 + \Delta f_3} = \frac{1}{f_3(1+1/m) + |PP'|} + \frac{1}{f_3(m+1)} \tag{4}$$

This yields $$\frac{1}{f_3(1+1/m) + |PP'|} = \frac{1}{f_3 + \Delta f_3} - \frac{1}{f_3(m+1)}$$

$$= \frac{f_3(m+1) - (f_3 + \Delta f_3)}{f_3(f_3 + \Delta f_3)(m+1)}$$

$$= \frac{(m \cdot f_3 - \Delta f_3)}{f_3(f_3 + \Delta f_3)(m+1)}$$

$$|PP'| = \frac{f_3(f_3 + \Delta f_3)(m+1)}{m \cdot f_3 - \Delta f_3} - f_3(1+1/m)$$

$$= \frac{f_3(f_3 + \Delta f_3)(m+1) - f_3(1+1/m)(m \cdot f_3 - \Delta f_3)}{m \cdot f_3 - \Delta f_3}$$

$$= \frac{f_3(m+1)[f_3 + \Delta f_3 - f_3 + \Delta f_3/m]}{m \cdot f_3 - \Delta f_3}$$

$$= \frac{\Delta f_3 \cdot f_3(m+1)(1+1/m)}{m \cdot f_3 - \Delta f_3}$$

Figure 1:
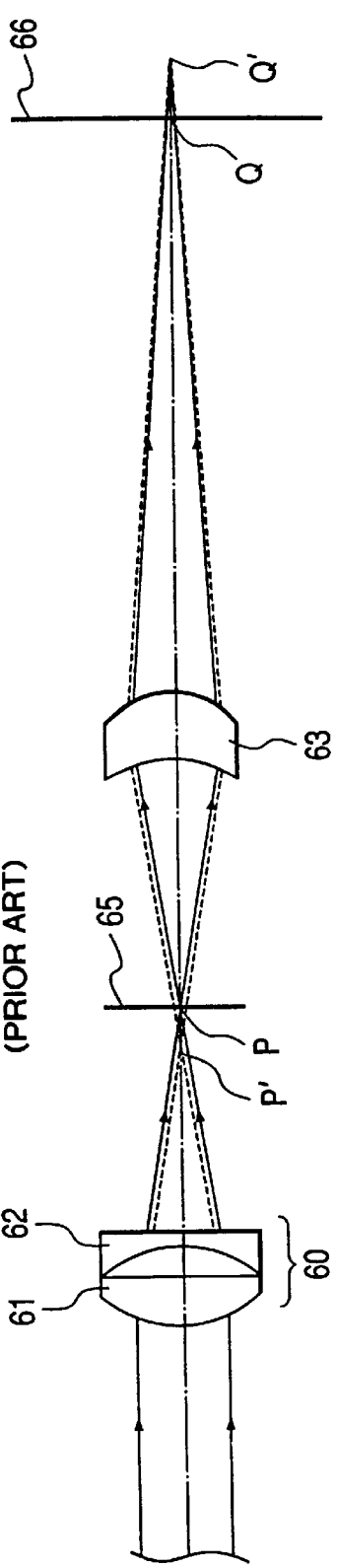
FIG. 1 is a sectional view showing a conventional scanning optical system.
Figure 2:
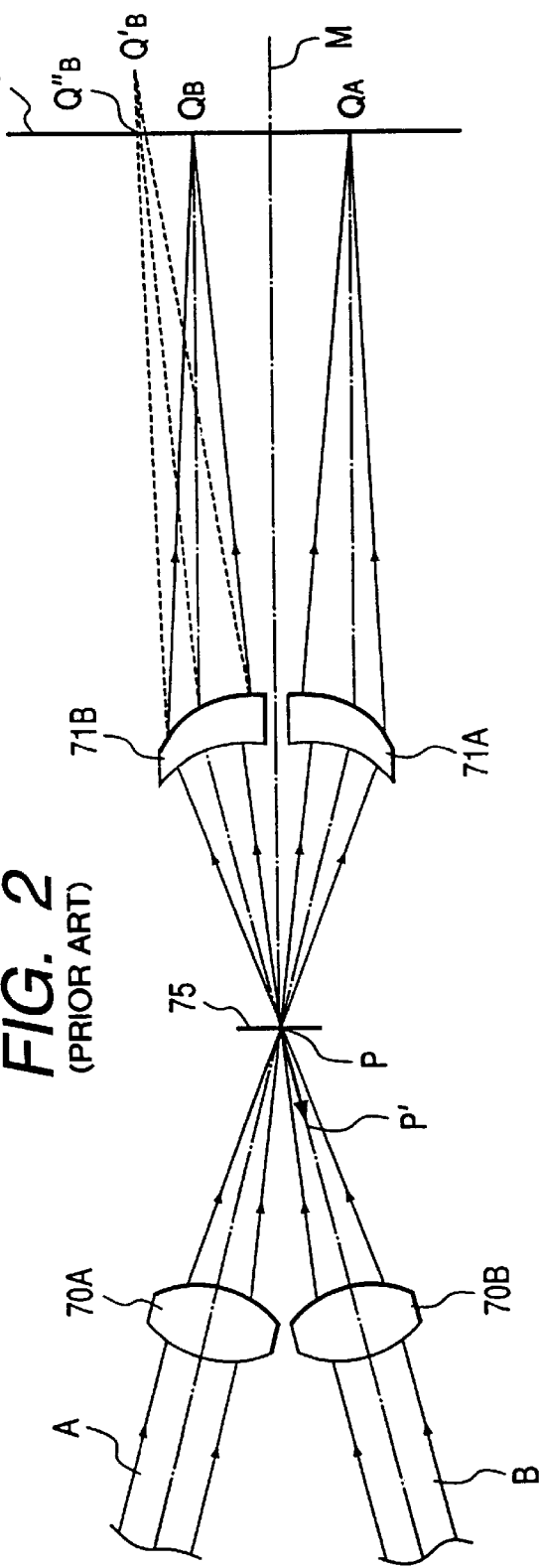
FIG. 2 is a sectional view showing a conventional multi-beam scanning optical system.

In this embodiment, to generate the variation amount $\Delta f_2$ of the focal length of the incident lens 2 after a temperature rise, the incident lens 2 has a hybrid structure constituted by the meniscus concave cylindrical lens 24 consisting of a plastic material and having a convex surface facing the incident side and the plano-convex cylindrical lens 25 consisting of a glass material and having a convex surface facing the incident side and a flat surface facing the exit side, as shown in FIG. 4. The conventional incident lens 60 shown in FIG. 2 has, from the light source means side, the plano-convex cylindrical lens 61 consisting of a glass material and the plano-concave lens 62 consisting of a plastic material. In this embodiment, however, the incident lens 2 has, from the light source means 4 side, the concave cylindrical lens 24 consisting of a plastic material and the plano-convex cylindrical lens 25 consisting of a glass material, as described above. The reason for this is as follows.

The incident lens 2 of this embodiment is more likely to generate spherical aberration than the prior art because the laser beam passes through the marginal portion (edge portion) of the cylindrical lens. In addition, to generate the desired variation amount $\Delta f_2$ during a temperature rise, the concave cylindrical lens 24 and the plano-convex cylindrical lens 25 must have a constant power ratio. If a plano-convex cylindrical lens consisting of a glass material has a curvature on each surface, the cylinder generating-lines of the two surfaces cannot obtain an appropriate positional relationship, resulting in a large increase in cost. To obtain a shape which allows satisfactory, spherical aberration correction and easy manufacturing while maintaining the power ratio between the convex and concave lenses, the structure using the meniscus concave cylindrical lens 24 made of a plastic material and the plano-convex cylindrical lens 25 made of a glass material is preferable, as described above.

The reason why the convex side of the plano-convex cylindrical lens 25 is directed to the concave cylindrical lens 24 is that defocus (shift in focus) is generated for the off-axis incident beam to reduce the spherical aberration on the imaging plane. In addition, letting Ra be the curvature of the concave cylindrical lens 24 on the plano-convex cylindrical lens 25 side, and letting Rb be the curvature of the plano-convex cylindrical lens 25 on the concave cylindrical lens 24 side, condition (5) is preferably satisfied to facilitate correct aberration correction.

$$1.0 \leq |Ra/Rb| \leq 1.2 \tag{5}$$

In addition, the concave cylindrical lens 24 is arranged on the incident side due to the following reason. If the plano-convex cylindrical lens 25 is arranged on the incident side, the flat surface is inevitably used as the incident surface. As a result, the laser beam is reflected by the flat surface of the plano-convex cylindrical lens 25 and is incident on the laser light-emitting unit as return light. In this embodiment, the concave cylindrical lens 24 is arranged on the incident side, as described above, thereby effectively preventing generation of return light.

As described above, in this embodiment, the respective elements constituting the scanning optical system are appropriately set such that equations (1) and (2) are satisfied. With this arrangement, temperature compensation of the plastic lens applied to the scanning optical system can be appropriately performed. Therefore, defocus or a shift in scanning position can be reduced, and the quality and stability of the apparatus is improved.

Figure 5:
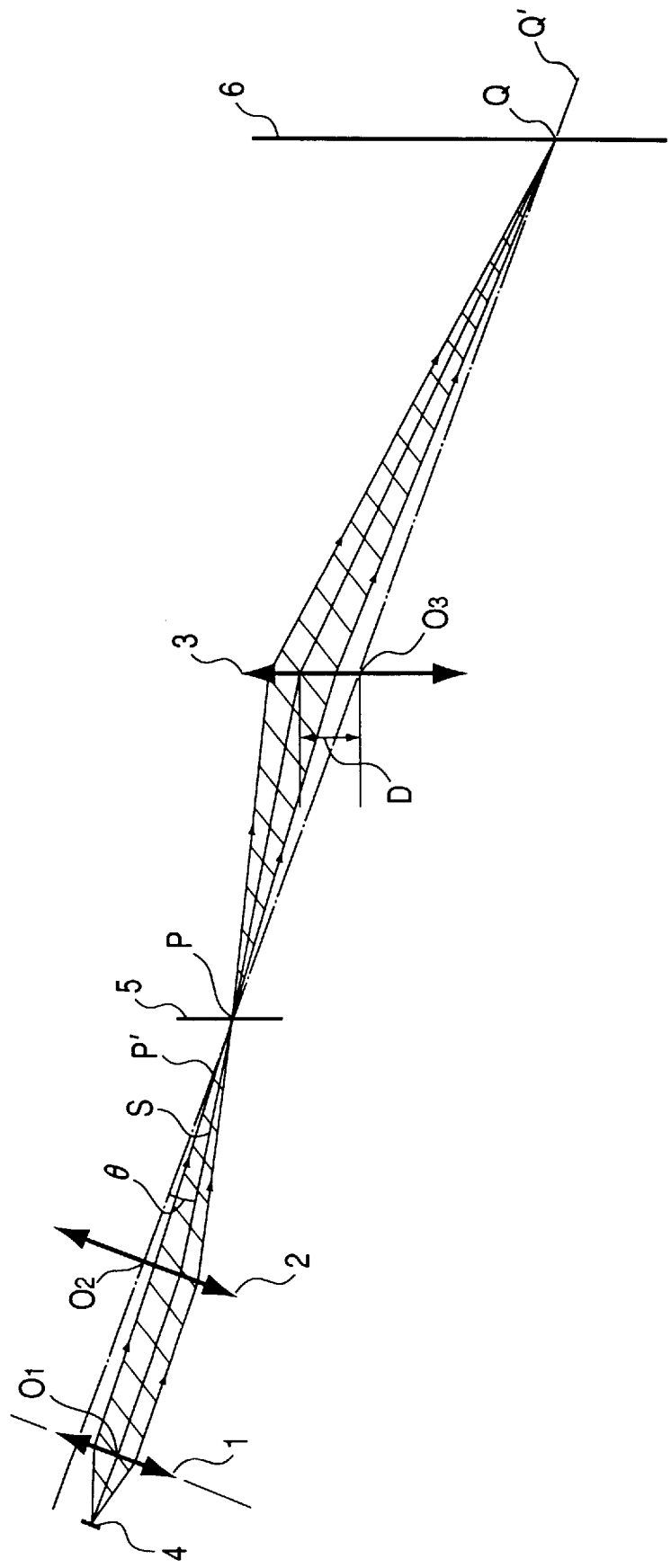
FIG. 5 is a sectional view showing the refractive power arrangement of a scanning optical system along the subscanning direction according to the second embodiment of he present invention.

FIG. 5 is a sectional view showing the refracting power arrangement of a scanning optical system along the sub-scanning direction according to the second embodiment of the present invention. The same reference numerals as in FIG. 3 denote the same elements in FIG. 5.

The second embodiment is different from the first embodiment in that a laser beam emitted from a light source means is obliquely incident on the deflection plane of an optical deflector within the subscanning section. The remaining arrangements and optical functions are almost the same as those of the first embodiment, so the same effect as described above is obtained.

More specifically, this embodiment comprises a collimator lens 1 serving as the first optical element which collimates a laser beam emitted from a light source means 4 into a parallel beam when the laser beam is to scan a target irradiation surface 6 through an optical deflector 5, an incident lens 2 serving as the second optical element which makes the parallel beam collimated by the collimator lens 1 obliquely incident on the deflection plane of the optical deflector 5 within the subscanning section and also focuses the parallel beam near the optical deflector 5, and an f-θ lens 3 serving as the third optical element which focuses the laser beam deflected by the deflection plane of the optical deflector 5 onto the target irradiation surface (recording medium surface) 6.

Within the subscanning section of the scanning optical system, the f-θ lens 3 is decentered from a principal ray S of the laser beam, the optical axis of the collimator lens 1 and that of the incident lens 2 are parallel decentered from each other, and a central point $O_3$ of the f-θ lens 3 is positioned on the extended line of the optical axis of the incident lens 2.

In this embodiment, focal points P and P' and imaging points Q and Q' before and after a temperature rise are set to be positioned on the optical axis ($O_2$–P) of the incident lens 2 and the extended line of the optical axis, as in the first embodiment.

As described above, in this embodiment:, when the respective elements constituting the scanning optical system are appropriately set, the same effect as in the first embodiment can be obtained independently of the incident angle of the laser beam on the optical deflector 5.

Figure 6:
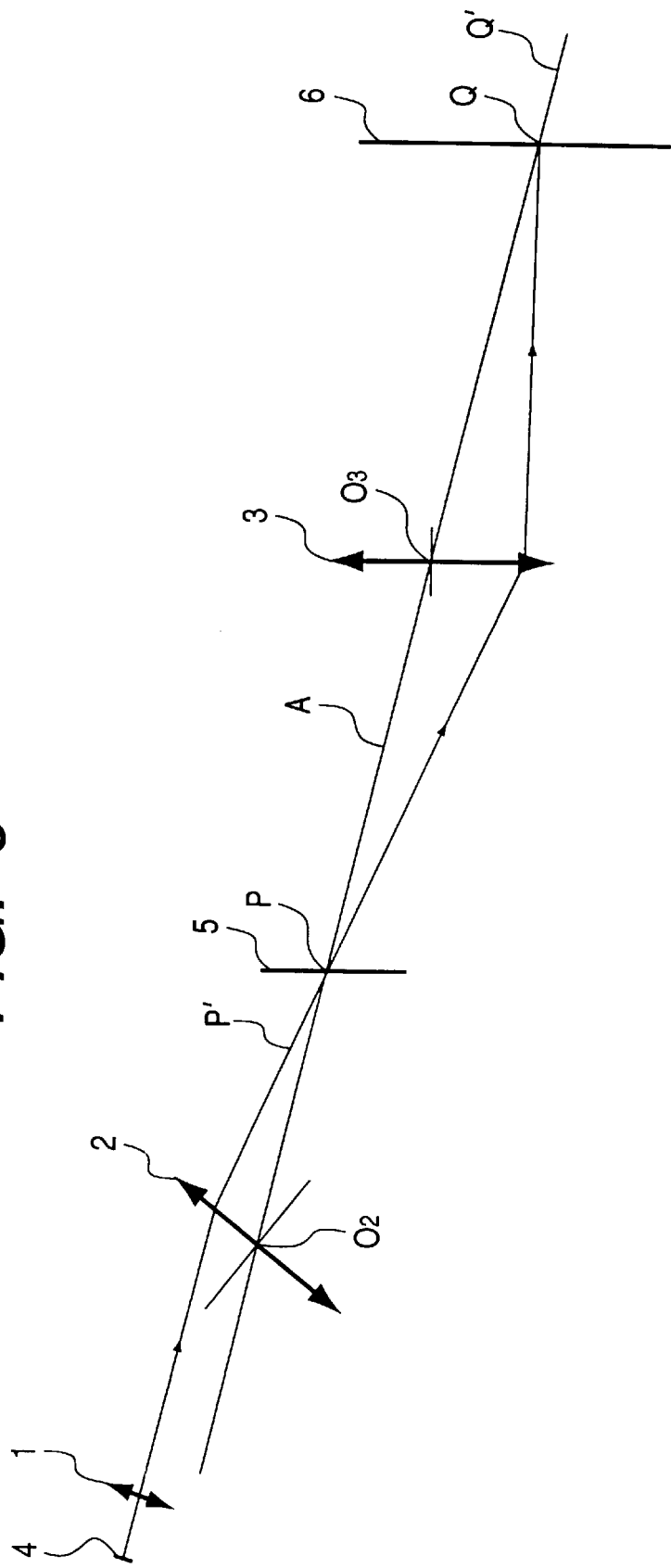
FIG. 6 is a sectional view showing the refractive power arrangement of a scanning optical system along the subscanning direction according to the third embodiment of the present invention.

FIG. 6 is a sectional view showing the refracting power arrangement of a scanning optical system along the sub-scanning direction according to the third embodiment of the present invention. The same reference numerals as in FIG. 3 denote the same elements in FIG. 6.

In this embodiment, the respective elements are set such that when a laser beam emitted from a light source means 4 is to be collimated into a parallel beam by the collimator lens as a first optical element 1 and made to be obliquely incident on the deflection plane of an optical deflector 5 through an incident lens 2 having a positive refracting power and serving as the second optical element, and the laser beam deflected by the deflection plane of the optical deflector 5 is to be guided onto a target irradiation surface (recording medium surface) 6 through an f-θ lens 3 consisting of a plastic material and serving as the third optical element to scan the target irradiation surface 6, the principal ray of the laser beam obliquely incident on the deflection plane of the optical deflector 5 within the subscanning section, the optical axis of the incident lens 2, and the normal of the deflection plane of the optical deflector 5 are not parallel to each other, a central point $O_2$ of the incident lens 2, a deflection point P of the optical deflector 5, and a central point $O_3$ of the f-θ lens 3 are positioned on the same straight line A, and the straight line A and the principal ray of the laser beam incident on the incident lens 2 are substantially parallel to each other.

More specifically, as in the above-described first and second embodiments, the incident lens 2 having the refracting power only within the subscanning section has, from the light source means 4 side, a meniscus concave cylindrical lens consisting of a plastic material and having a convex surface facing the incident side, and a plano-convex cylindrical lens consisting of a glass material and having a convex surface facing the incident side and a flat surface facing the exit side.

For the f-θ lens 3, the focal point P, and an imaging point Q are optically conjugate with each other within the subscanning section at ambient temperature, as in the first and second embodiments. The respective elements are arranged such that, after is temperature rise, the focal point P and an imaging point Q' or a focal point P' and the imaging point Q are optically conjugate with each other within the subscanning section.

As described above, in this embodiment, when the respective elements constituting the scanning optical system are appropriately set, the same effect as in the first and second embodiments can be obtained independently of the incident angle of the laser beam on the optical deflector.

Figure 7:
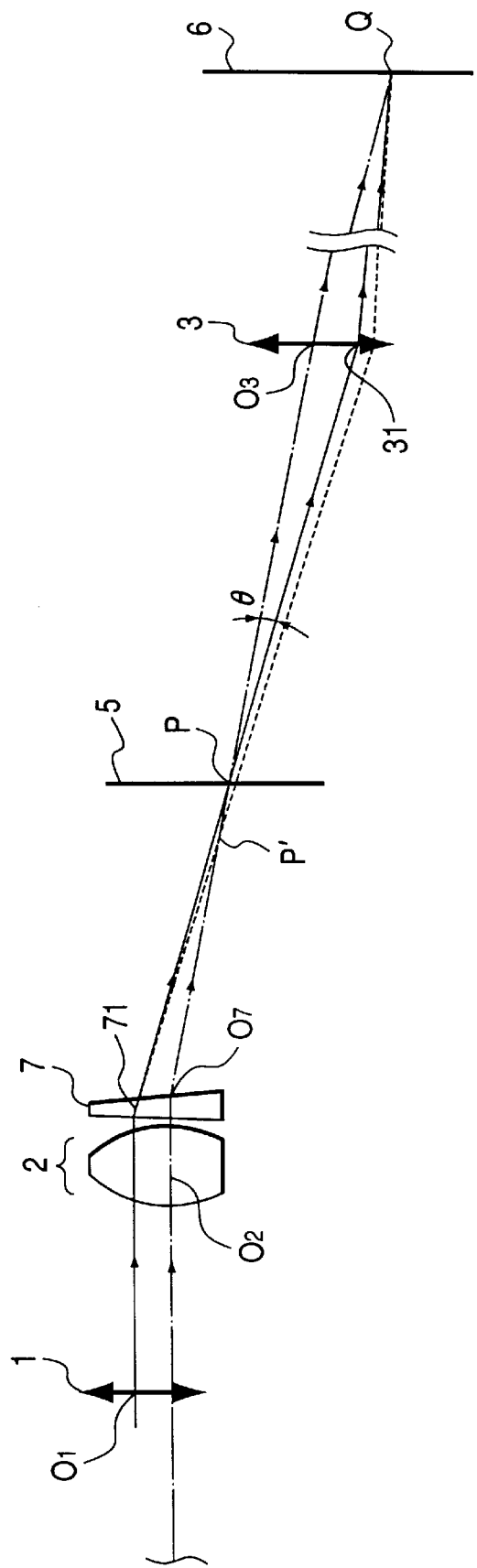
FIG. 7 is a sectional view showing the refractive power arragement of a scanning optical system along the subscanning direction according to the fourth embodiment of the present invention.

FIG. 7 is a sectional view showing the refracting power arrangement of a scanning optical system along the subscanning direction according to the fourth embodiment of the present invention. The same reference numerals as in FIG. 3 denote the same elements in FIG. 7.

The fourth embodiment is different from the third embodiment in that a prism is arranged in the optical path near and after an incident lens 2 having a positive refracting power and serving as thus second optical element. The remaining arrangements and optical functions are almost the same as those of the first and second embodiments, so the same effect as described above is obtained. In FIG. 7, a prism 7 functions to deflect the optical path.

In this embodiment, the elements are arranged such that when a laser beam emitted from a light source means (not shown) is collimated by a collimator lens 1 serving as a first optical element and is made to be obliquely incident on the deflection plane of an optical deflector 5 through the incident lens 2 having a positive refracting power and serving as the second optical element, and the image of the laser beam deflected by the deflection plane of the optical deflector 5 is to be formed on a target irradiation surface (recording medium surface) 6 through an f-θ lens 3 consisting of a plastic material and serving as the third optical element to scan the target irradiation surface 6, the prism 7 is arranged in the optical path between the incident lens 2 and the optical deflector 5, the optical axis of the incident lens 2 and that of the collimator lens 1 are parallel decentered from each other, and a central point $O_3$ of the f-θ lens 3 is positioned on the extended line of the optical axis of the incident lens 2.

With this arrangement, in the fourth embodiment, an incident angle θ of the laser beam incident on the deflection plane of the optical deflector 5 within the subscanning section is satisfied by optical path deflection by the prism 7 and translation of the optical axes of the collimator lens 1 and the incident lens 2. This incident angle θ is formed by the principal ray (71-P-31) of the laser beam and the optical axis ($O_2$-$O_7$-P) of the incident lens 2 (the optical axis of the incident lens 2 is deflected by the prism 7), as in the first embodiment.

As described above, in this embodiment, when the respective elements constituting the scanning optical system are appropriately set, the optical axes of the collimator lens 1 and the incident lens 2 themselves can be set to be perpendicular to the deflection plane of the optical deflector 5, so that the degree of freedom in arrangement of the collimator lens 1 and the incident lens 2 can be increased.

Figure 8:
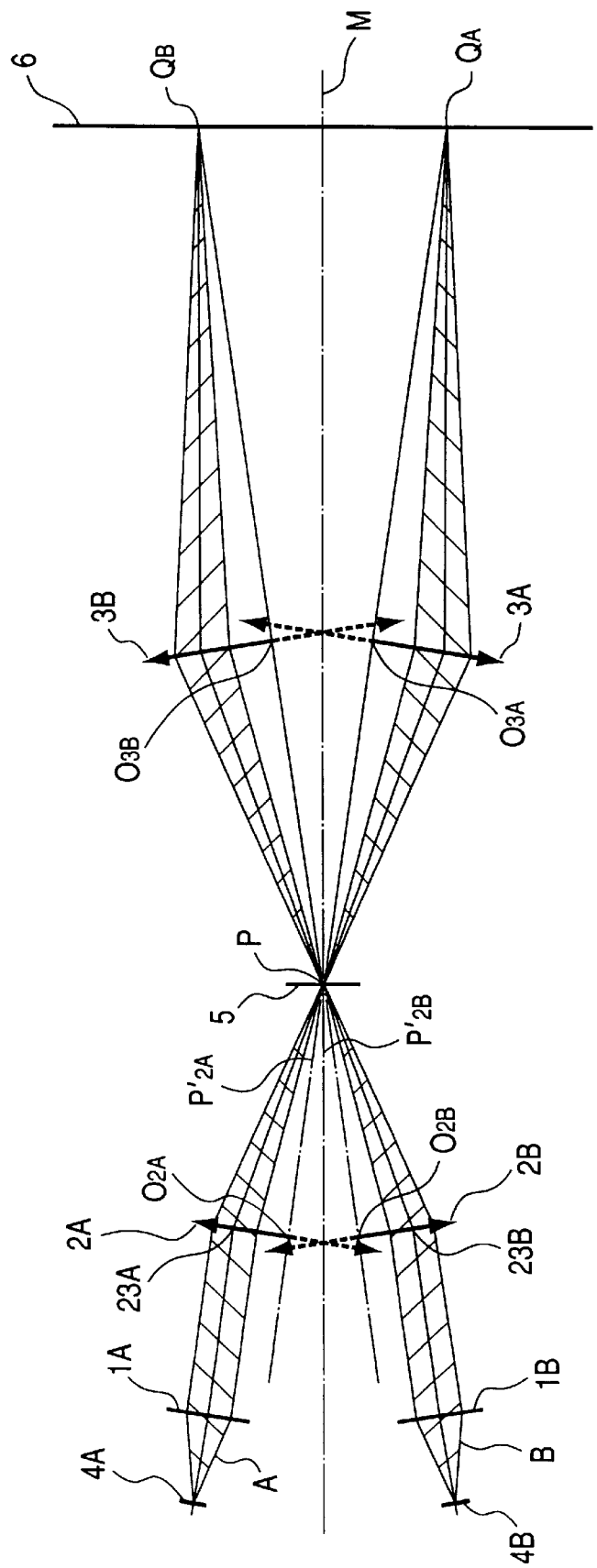
FIG. 8 is a sectional view showing the refractive power arragement of first embodiment of a multi-beam scanning optical system of the present invention along the subscanning direction.

FIG. 8 is a sectional view showing the refractive power arrangement of first embodiment of a multi-beam scanning optical system of the present invention along the subscanning direction. The same reference numerals as in FIG. 5 denote the same elements in FIG. 8.

In this embodiment, of the above-described various scanning optical systems using the oblique incident scheme, at least one scanning optical system is applied to a multi-beam scanning optical system. The scanning optical systems of the remaining embodiments can also be applied to the multi-beam scanning optical system.

Referring to FIG. 8, each of light source means 4A and 4B comprises, e.g., a semiconductor laser. Collimator lenses 1A and 1B as the first optical elements are arranged in correspondence with the light source means 4A and 4B, respectively. Each of incident lenses 2A and 2B serving as the second optical elements has a positive refracting power and also has the same lens structure as that of the above-described embodiments. The incident lenses 2A and 2B are arranged in correspondence with the light source means 4A and 4B, respectively. An optical deflector 5 serving as a deflection means comprises, e.g., a polygon mirror and is rotated by a driving means such as a motor (not shown) at a predetermined speed. F-θ lenses 3A and 3B consisting of a plastic material serve as the third optical elements and are arranged in correspondence with the light source means 4A and 4B, respectively. A photosensitive drum surface 6 corresponds to a target irradiation surface. Central points (optical axes) $O_{2A}$, $O_{2B}$, $O_{3A}$ and $O_{3B}$ of the incident lenses (2A and 2B) and the f-θ lenses (3A and 3B) are arranged above and below a symmetrical axis M to be symmetrical about the symmetrical axis M. In this embodiment, each of the incident lenses (2A and 2B) and the f-θ lenses (3A and 3B) is partially cut (the cut portions are indicated by broken lines), as shown in FIG. 4, to prevent interference.

In this embodiment, two laser beams A and B emitted from the two light source means 4A and 4B are collimated by the collimator lenses 1A and 1B corresponding to the two laser beams A and B into almost parallel beams (collimated beams) and are incident on the corresponding incident lenses 2A and 2B, respectively. Within the main scanning section perpendicular to the subscanning section, the incident lenses 2A and 2B directly output the incident parallel beams. Within the subscanning section, the incident lenses 2A and 2B focus the light beams and make them obliquely incident on the deflection plane of the optical deflector 5 to form almost linear images of the light beams near the deflection plane. The images of the two laser beams A and B deflectively reflected by the deflection plane are simultaneously formed at different positions $Q_A$ and $Q_B$ on the target irradiation surface 6 through the f-θ lenses 3A and 3B corresponding to the two laser beams A and B, respectively. When the optical deflector 5 is rotated, the target irradiation surface (recording medium surface) 6 is scanned in the main scanning direction to record image information. Note that the interval between the imaging points $Q_A$ and $Q_B$ on the target irradiation surface 6 is set at a desired value.

In this embodiment, the central points ($O_{3A}$ and $O_{3B}$) of the f-θ lenses (3A and 3B) are set to be positioned on the extended lines of the optical axes of the incident lenses (2A and 2B), respectively, as in the scanning optical systems described in the above embodiments. More specifically, each of the line connecting the points $O_{2A}$-P-$O_{3A}$-$Q_A$ and the line connecting the points $O_{2B}$-P-$O_{3B}$-$Q_B$ is on a straight line, as shown in FIG. 8.

As described above, in this embodiment, the plurality of laser beams A and B are focused to the deflection point P on the deflection plane at ambient temperature. Upon a temperature rise, the focal points corresponding to the plurality of laser beams are moved to $P'_{2A}$ and $P'_{2B}$, respectively, such that the focal points $P'_{2A}$ and $Q_A$ are conjugate with each other through the f-θ lens 3A and so are the focal points $P'_{2B}$ and $Q_B$ through the f-θ lens 3B after the temperature rise. With this arrangement, even in the multi-beam scanning optical system using the oblique incident scheme, the defocus or a shift in the scanning position can be reduced.

In this embodiment, the two laser beams A and B passing through the incident lenses 2A and 2B, respectively, are focused to the same deflection point P on the deflection plane. However, the deflection points of the two laser beams need not always match, as far as they are within the allowable range of the size of the polygon mirror 5 or the tolerance of the f-θ lenses 3A and 3B.

According to the present invention, temperature compensation of the plastic lens applied to the scanning optical system and multi-beam scanning optical system is appropriately performed, and especially, the respective elements of the scanning optical system and multi-beam scanning optical system using the oblique incident scheme are appropriately arranged, as described above. With this arrangement, a scanning optical system and multi-beam scanning optical system capable of reducing defocus or a shift in scanning position to improve the quality stability of the apparatus can be realized.

In addition, according to the present invention, a low-profile polygon mirror can be used in the multi-beam scanning optical system, as described above, so a multi-beam scanning optical system capable of reducing the load on the motor can be realized.

What is claimed is:

1. A scanning optical system comprising:

light source means;

an optical deflector for deflecting a laser beam emitted from said light source means;

a first optical element for collimating the laser beam emitted from said light source means into a parallel beam;

a second optical element for focusing the parallel beam collimated by said first optical element to said optical deflector and making the parallel beam incident on said optical deflector; and a third optical element for focusing the laser beam deflected by a deflection plane of said optical deflector onto a target irradiation surface, wherein within a subscanning section of said scanning optical system, an optical axis of said first optical element and an optical axis of said second optical element are parallel decentered from each other, said second optical element and said third optical element are decentered from a central axis of said scanning optical system, the optical axis of said second optical element crosses the central axis of said scanning optical system near said optical deflector, the optical axis of said first optical element crosses the central axis of said scanning optical system near said second optical element, a central point of said third optical element is positioned on an extended line of the optical axis of said second optical element, and the optical axis of said second optical element and normal of said deflection plane of said optical deflector are not parallel to each other.

2. A system according to claim 1, wherein said second optical element comprises, from said light source means side, a meniscus concave cylindrical lens essentially consisting of a plastic material and having a convex surface facing an incident side, and a plano-convex cylindrical lens essentially consisting of a glass material and having a convex surface facing the incident side and a flat surface facing an exit side.

3. A system according to claim 2, wherein each of said concave cylindrical lens and said plano-convex cylindrical lens is partially cut and asymmetrical about an optical axis.

4. A system according to claim 1, wherein said third optical element has a plastic lens.

5. A system according to claim 1, wherein letting θ be an angle formed by the optical axis of said second optical element and the principal ray of the laser beam incident on said optical deflector, the following equation is satisfied:

$$\theta \simeq \tan^{-1}\left[\frac{D}{f_3(1+m)}\right]$$

where m is the magnification of said third optical element in a subscanning direction $f_3$ is the focal length of said third optical element in the subscanning direction D is the decentering amount of said third optical element with respect to the principal ray of the laser beam.

6. A system according to claim 1, or wherein letting $\Delta f_2$ be a variation amount of a focal length of said second optical element in a subscanning direction due to an environmental variation, the following equation is satisfied:

$$|\Delta f_2| \simeq \frac{\Delta f_3 \cdot f_3(m+1)(1+1/m)}{m \cdot f_3 - \Delta f_3}$$

where $\Delta f_3$ is the variation amount of a focal length of said third optical element in the subscanning direction due to the environmental variation;

m is the magnification of said third optical element in the subscanning direction;

$f_3$ is the focal length of said third optical element in the subscanning direction; and D is the decentering amount of said third optical element with respect to the principal ray of the laser beam.

7. A laser beam printer apparatus comprising:

light source means;

an optical deflector for deflecting a laser beam emitted from said light source means;

a first optical element for collimating the laser beam emitted from said light source means into a parallel beam;

a second optical element for focusing the parallel beam collimated by said first optical element to said optical deflector and making the parallel beam incident on said optical deflector;

a recording medium; and third optical element for focusing the laser beam deflected by a deflection plane of said optical deflector onto a surface of said recording medium, wherein within a subscanning section of a scanning optical system constituted by said light source means, said optical deflector, said first optical element, said second optical element, and said third optical element, an optical axis of said first optical element and an optical axis of said second optical element are parallel decentered from each other, said second optical element and said third optical element are decentered from a central axis of said scanning optical system, the optical axis of said second optical element crosses the central axis of said scanning optical system near said optical deflector, the optical axis of said first optical element crosses the central axis of said scanning optical system near said second optical element, a central point of said third optical element is positioned on an extended line of the optical axis of said second optical element, and the optical axis of said second optical element and a normal of said deflecting plane of said optical deflector are not parallel to each other.

8. An apparatus according to claim 7, wherein said second optical element comprises, from said light source means side, a meniscus concave cylindrical lens essentially consisting of a plastic material and having a convex surface facing an incident side, and a plano-convex cylindrical lens essentially consisting of a glass material and having a convex surface facing the incident side and a flat surface facing an exit side.

9. An apparatus according to claim 8, wherein each of said concave cylindrical lens and said plano-convex cylindrical lens is partially cut and asymmetrical about an optical axis.

10. An apparatus according to claim 7, wherein said third optical element has a plastic lens.

11. An apparatus according to claim 7, wherein letting θ be an angle formed by the optical axis of said second optical element and the principal ray of the laser beam incident on said optical deflector, the following equation is satisfied:

$$\theta \simeq \tan^{-1}\left[\frac{D}{f_3(1+m)}\right]$$

where m is the magnification of said third optical element in the subscanning directions;

$f_3$ is the focal length of said third optical element in the subscanning direction; and D is the decentering amount of said third optical element with respect to the principal ray of the laser beam.

12. An apparatus according to claim 7, wherein letting $\Delta f_2$ be a variation amount of a focal length of said second optical element in a subscanning direction due to an environmental variation, the following equation is satisfied:

$$|\Delta f_2| \simeq \frac{\Delta f_3 \cdot f_3(m+1)(1+1/m)}{m \cdot f_3 - \Delta f_3}$$

where $\Delta f_3$ is the variation amount of a focal length of said third optical element in the subscanning direction due to the environmental variation;

m is the magnification of said third optical element in the subscanning direction;

$f_3$ is the focal length of said third optical element in the subscanning direction; and D is the decentering amount of said third optical element with respect to the principal ray of the laser beam.

* * * * *

UNITED STATES PATENT AND TRADEMARK OFFICE
CERTIFICATE OF CORRECTION

PATENT NO. : 5,966,232

DATED : October 12, 1999

INVENTOR(S) : KAZUMI KIMURA ET AL.

Page 1 of 2

It is certified that error appears in the above-identified patent and that said Letters Patent is hereby corrected as shown below:

COLUMN 3
Line 33, "opti☐al" should read --optical--.

COLUMN 5
Line 50, "wherein" should be deleted.

COLUMN 6
Line 19, "secondoptical" should read --second optical--.

COLUMN 8
Line 39, "and" should be deleted; and
Line 41, "section)" should read --section); and--.

UNITED STATES PATENT AND TRADEMARK OFFICE
CERTIFICATE OF CORRECTION

PATENT NO. : 5,966,232

DATED : October 12, 1999

INVENTOR(S) : KAZUMI KIMURA ET AL.

It is certified that error appears in the above-identified patent and that said Letters Patent is hereby corrected as shown below:

<u>COLUMN 11</u>
Line 6, "embodiment:," should read --embodiment,--; and
Line 54, "is" should read --a--.

<u>COLUMN 12</u>
Line 4, "thus" should read --the--.

<u>COLUMN 14</u>
Line 3, "quality" should read --quality and--.

Signed and Sealed this

Nineteenth Day of September, 2000

Attest:

Q. TODD DICKINSON

*Attesting Officer*    *Director of Patents and Trademarks*